United States Patent [19]
Nagano

[11] Patent Number: 4,573,950
[45] Date of Patent: Mar. 4, 1986

[54] CHAIN GUIDE IN A FRONT DERAILLEUR
[75] Inventor: Masashi Nagano, Izumi, Japan
[73] Assignee: Shimano Industrial Company Limited, Osaka, Japan
[21] Appl. No.: 622,583
[22] Filed: Jun. 20, 1984
[30] Foreign Application Priority Data
Jun. 24, 1983 [JP] Japan ............................ 58-98468[U]
[51] Int. Cl.[4] ............................................. F16H 7/18
[52] U.S. Cl. ...................................... 474/80; 474/144
[58] Field of Search ................... 474/80, 82, 140, 144; 180/84

[56] References Cited
U.S. PATENT DOCUMENTS
4,223,562  9/1980  Nagano et al. ......................... 474/82

Primary Examiner—Stephen J. Novosad
Assistant Examiner—Thuy M. Bui
Attorney, Agent, or Firm—Stevens, Davis, Miller & Mosher

[57] ABSTRACT

A chain guide in a front derailleur has an inner guide plate and an outer guide plate, the outer guide plate having a chain biasing region coming into contact with and biasing a driving chain when the chain is switched from a larger diameter front chain gear to a smaller diameter front chain gear and a chain moving region which is positioned below the biasing region and through which the chain moves when the chain is switched to the smaller diameter front gear. The chain moving region includes a swollen portion swelling outwardly with respect to the front chain gears, thereby eliminating sound generation without sacrificing speed change efficiency.

3 Claims, 4 Drawing Figures

CHAIN GUIDE IN A FRONT DERAILLEUR

FIELD OF THE INVENTION

This invention relates to an improvement in a chain guide used in a front derailleur for a bicycle, and more particularly to an improvement in a chain guide in a front derailleur, which switches a driving chain to one of a plurality of front chain gears and is provided with an inner guide plate and an outer guide plate comprising elongate and lengthwise curved plates and substantially parallel to each other and spaced at an interval larger than a width of the chain, and supported movably axially of the front chain gears.

BACKGROUND OF THE INVENTION

Conventionally, the inner and outer plates at the chain guide in the front derailleur are spaced at an interval larger than a width of the chain, and if the interval is too large, an amount of moving the chain guide should be increased for switching the chain, thereby creating a problem in that the control lever stroke becomes longer thus deteriorating the speed change efficiency. Hence, the interval is restricted by itself.

In a case where the conventional chain guide, as shown in FIG. 4, is used and the front and rear derailleurs are operated to switch the chain C from one of the multistage front gears FG to one of the multistage rear gears RG, the chain line of chain C inclines between the front chain gear FG and the rear one RG, especially largely between a low speed front chain gear $FG_1$ and a high speed rear chain gear $RG_1$, thereby creating a problem in that the chain C may come into contact with the outer plate of the chain guide at the front derailleur to generate sounds. Especially, when three front chain gears, or six rear chain gears, are used, the above trouble is often created.

Thus, it has been difficult to eliminate sound generation without sacrificing the speed change efficiency, whereby a chain guide superior in speed change efficiency and free from sound generation has earnestly been demanded.

SUMMARY OF THE INVENTION

An object of the invention is to provide a chain guide which is improved in its outer plate and simple in construction to thereby avoid sound generation without sacrificing the speed change efficiency.

The invention is directed to provision of a swollen portion at the outer guide plate of the conventional chain guide comprising outer and inner plates spaced at an interval larger than a width of the chain but restricted to a minimum, the swollen portion being swollen outwardly with respect to the front derailleur.

In detail, the outer guide plate has a chain biasing region where the chain when switched from a larger diameter front gear to a smaller diameter one, comes into contact with the outer guide plate and a chain moving region through which the chain passes when switched to the smaller diameter front chain gear, the chain moving region being positioned below the chain biasing region and including the aforesaid swollen portion.

Therefore, even when the chain is switched in the largely inclining chain line from the smaller diameter low speed front chain gear to the smaller diameter high speed rear chain gear, the outer guide plate can reliably avoid contact with the chain to thereby prevent sound generation caused by contact with the chain and keep the speed change efficiency not-deteriorative.

In addition, the interval between the outer guide plate and the inner guide plate is larger than the width of the chain, but is kept to a minimum as in the conventional one in consideration of speed change efficiency. The outer guide plate is spaced at the swollen portion from the inner guide plate at a larger interval. Hence, an inside swollen portion may be provided on an idle region at the inner guide plate, which is formed below the chain biasing region inclusive of the chain moving region, the inside swollen portion being swollen toward the smaller diameter front chain gear. Thus, even when the chain shifts over the smaller diameter front chain gear for switching thereto from the larger diameter high speed front chain gear, escape of the chain from the smaller diameter front gear is prevented. Also, in a case where a mudguard mounted to the bicycle rear wheel extends toward the front derailleur, interference thereof with the mudguard is prevented.

Other objects and aspects of the invention will become apparent from the following description of embodiments with reference to the accompanying drawings.

DETAILED DESCRIPTION OF THE INVENTION

Figure 1:
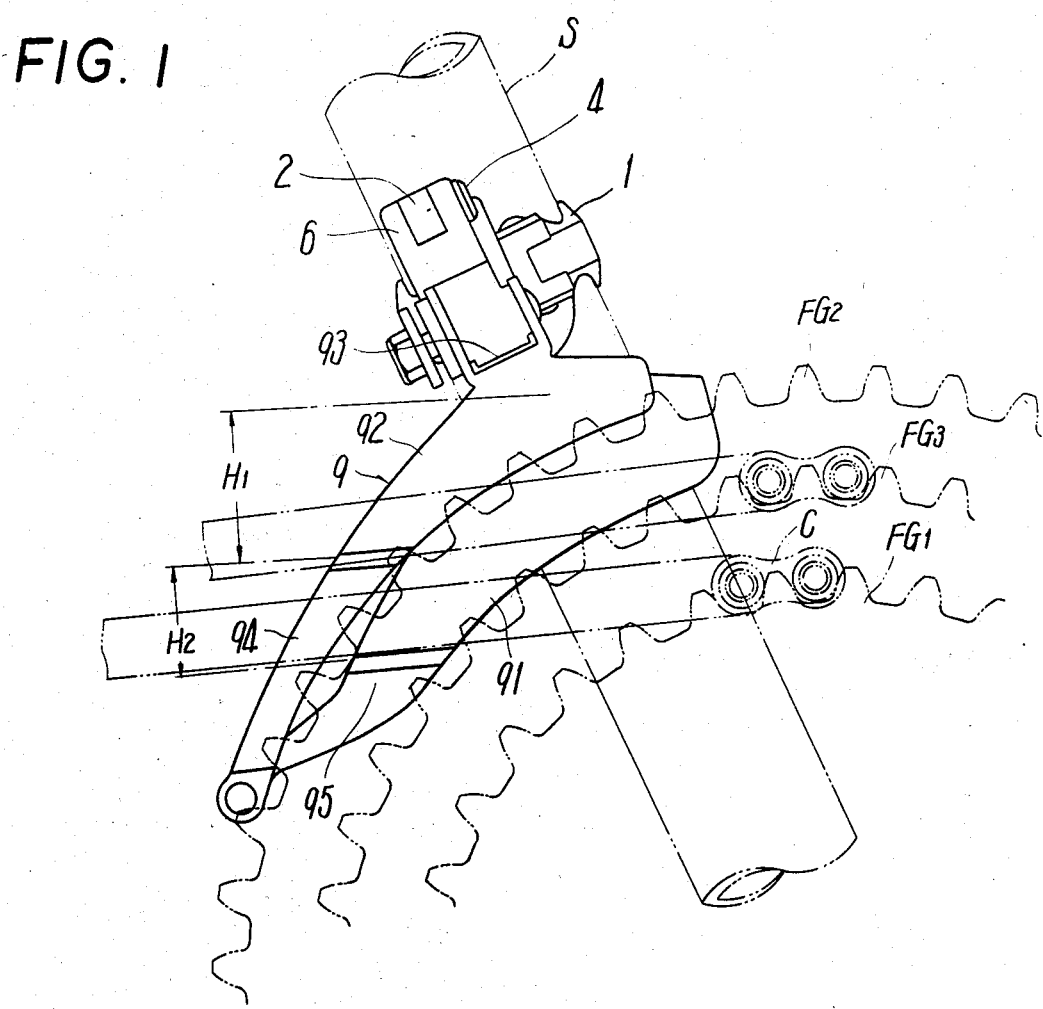
FIG. 1 is a front view of an embodiment of a front derailleur of the invention.

A front derailleur shown in the drawings comprises a fixing member 2 fixed to a seat tube S at the bicycle through a tightening band 1, a pair of linkage members 5 and 6 pivoted to the fixing member 2 through two pivot pins 3 and 4, and a chain guide 9 of the invention supported swingably to the utmost ends of linkage members 5 and 6 through two pivot pins 7 and 8. Chain guide 9 is supported to the fixing member 2 through the linkage member 6 in relation of being movable axially of front gears $FG_1$ to $FG_3$. Between the chain guide 9 and the linkage member 6 is interposed a return spring (not shown), through which the chain guide 9 is biased toward a low speed front chain gear $FG_1$. A control wire (not shown) fixed to the linkage member 6 through a fixture (not shown) is pulled to swing the linkage members 5 and 6 to thereby move the chain guide 9 toward and axially of a high speed front chain gear $FG_2$. The control wire and is slackened to return the chain guide 9 toward the low speed front chain gear $FG_1$ by a restoring force of the return spring.

Two adjusting bolts 10 and 11 are mounted, to the fixing member 2. The tips of bolts 10 and 11 oppose the edge of linkage member 5 at its side which is pivoted to the fixing member 2, thereby restricting a range of swinging motion of linkage member 5.

The present invention is directed to an improvement in the chain guide 9 at the aforesaid front derailleur of usual construction.

Figure 2:
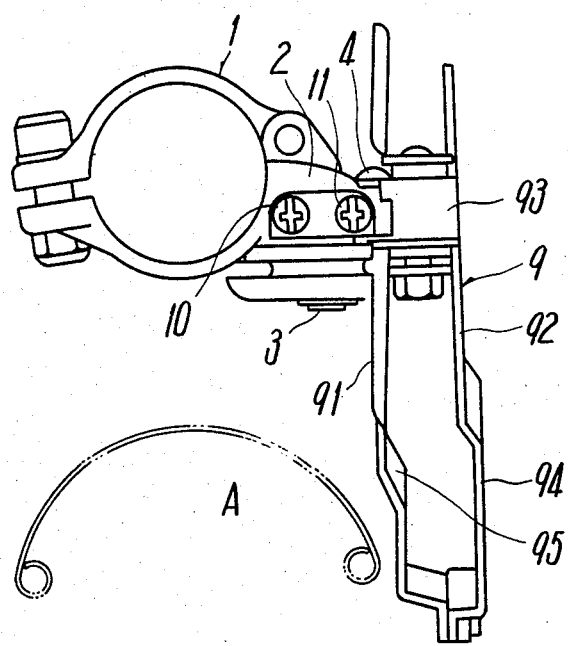
FIG. 2 is a plan view thereof.
Figure 3:
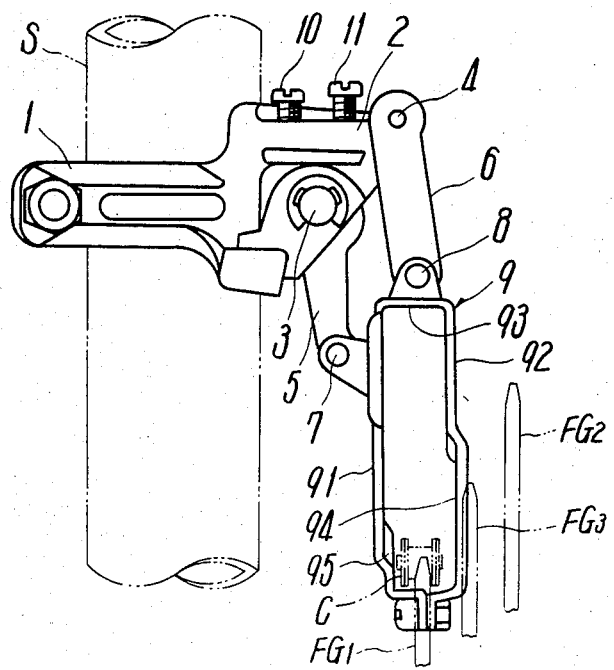
FIG. 3 is a side view of the same.
Figure 4:
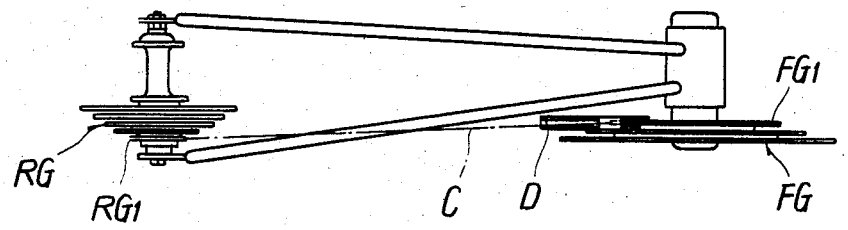
FIG. 4 is an illustration of the relation between front chain gears, rear chain gears, a front derailleur and a driving chain.

The chain guide 9, as shown in FIG. 1, comprises an inner guide plate 91 and an outer guide plate 92 comprising elongate and lengthwise curved plates respectively as shown in FIG. 1 and substantially parallel to each other as shown in FIGS. 2 and 3. Guide 9 also includes a connecting plate 93 connecting both plates 91 and 92 opposite to each other at an interval larger than a width of a driving chain C. Between the inner guide plate 91 and the outer guide plate 92, the chain C is inserted and transported therebetween.

When the chain C is intended to be switches from the smaller diameter low speed front chain gear $FG_1$ to the larger diameter high speed front chain gear $FG_2$, the inner guide plate 91 contacts at the inner surface with one side of the chain C engaging with the gear $FG_1$ and biases the chain C toward the gear $FG_2$ so that the chain C disengages from the gear $FG_1$ to be switched to the gear $FG_2$. On the contrary, the outer guide plate 92 contacts at the inner surface thereof with the other side of chain C engaging with the gear $FG_2$ and biases the chain C toward the gear $FG_1$, so that the chain disengages from the gear $FG_2$ to be switched to the gear $FG_1$.

Now, in the front derailleur for the low speed front chain gear $FG_1$, middle speed one $FG_3$, and high speed one $FG_2$ in the three speed-change stages as shown, the outer guide plate 92 at the chain guide 9 has a chain biasing region $H_1$ and a chain moving region $H_2$ positioned thereunder. Chain biasing region $H_1$, biasing the chain C when switched from the high speed stage front chain gear FG to the low speed stage one, and the chain moving region $H_2$ allows the chain C to move when switched to the smaller diameter low speed front chain gear $FG_1$. Outer guide plate 92 has an outside swollen portion 94 swelling outwardly with respect to the front chain gear FG, thereby preventing the chain C from making contact with the outer guide plate 92.

A stepped portion is provided at the border between the swollen portion 94 and a not-swollen portion as shown in FIG. 3, which is preferably substantially parallel to the movement path of chain C engaging with each front chain gear. The swollen portion 94 is made wide and deep to an extent of not-contacting with the chain C stretched across the low speed front chain gear $FG_1$ and high speed rear chain gear $RG_1$. In addition, the swollen portion 94 is allowable of swelling close to a crank arm for a crank means at the bicycle.

In the above construction, the chain guide 9 moves forwardly to bring the inner surface of inner plate 91 into contact with one side of chain C and bias the same toward the middle or high speed front chain gear $FG_3$ or $FG_2$, thereby switching the chain C thereto from the low speed front chain ear $FG_1$. On the contrary, the chain guide 9 is moved backwardly to bring the inner surface of outer plate 92 with one side of chain C engaging with the gear $FG_2$ or $FG_3$ and biases the same toward the low speed front chain gear $FG_1$, thereby switching the chain C reversely.

At this time, since no swollen portion is provided at the inner surface of biasing region $H_1$, well switching of chain C to the low speed front chain gear $FG_1$ is performable the same as in a conventional guide. The chain C switched to the low speed front chain gear $FG_1$, even when largely inclined at its chain line, can reliably be prevented from coming into contact with the outer guide plate 92 because the swollen portion 94 is provided at the chain moving region $H_2$ at the outer guide plate 92.

In the embodiment shown in FIGS. 1 through 3, the inner guide plate 91 is made larger in width than the outer guide plate 92 and lower in the lower edge than outer guide plate 92 The lower edge of outer guide plate 92 is formed in a circular arc conforming with the pitch circle of the larger diameter high speed front chain gear $FG_2$. The lower edge of inner guide plate 91 is made in a circular arc conforming with the pitch circle of middle speed front chain gear $FG_3$. Thus, the chain guide 9 is used as shown in FIG. 1.

In such construction, the inner guide plate 91 is made larger in width to allow its chain biasing portion to move close to the low or middle speed front chain gear $FG_1$ or $FG_3$ when the chain C is switched from the low speed front chain gear $FG_1$ to the middle speed front chain gear $FG_3$ and from the middle speed front chain gear $FG_3$ to the high speed front chain gear $FG_2$. Hence the movement of chain guide 9 necessary for chain switching can be reduced to that extent, thereby improving the chain switching efficiency.

The inner guide plate 91, which biases the chain C from the low speed stage to the high speed stage, also has a chain biasing region corresponding to the chain biasing region $H_1$ and moving region $H_2$ at the outer guide plate 91, and has an idle region below the biasing region as shown in FIG. 1.

The idle region is free from traversal of chain C even when engaging with the smaller diameter low speed front chain gear $FG_1$ and provides an inside swollen portion 95 swelling inwardly with respect to the front chain gear FG. Hence, even when the chain guide 9 shifts over the low speed front chain gear $FG_1$, the inside swollen portion 95 can prevent the chain C from falling down outwardly from the teeth tips of the gear $FG_1$, thereby being effective for the reliable chain switching. Also, when the chain guide 9 over-shifts the low speed front chain gear $FG_1$ to switch the chain C, the swollen portion 95 can prevent the inner plate 91 from interference with a mudguard A for the rear wheel at the bicycle. In addition, it is preferable to provide the inside swollen portion 95 at the fore end of inner guide plate 91 from the position free from interference with the chain C in engagement with the low speed front chain gear $FG_1$.

Alternatively, the present invention may be applicable to a front derailleur for two or four or more front chain gears in the multistage speed change.

As seen frm the above, the chain gear of the invention is provided with the outside swollen portion as the aforesaid, so that the chain, even when the chain line thereof is largely inclined across the low speed front chain gear and high speed rear chain gear, can reliably be prevented from contact with the outer guide plate and eliminate sound gneration without sacrificing the speed change efficiency.

While a preferred embodiment of the invention has been described using specific terms, such description is for illustrative purpose only, and it is to be understood that the changes and variations may be made without departing from the spirit or scope of the following claims.

What is claimed is:

1. A chain guide for a front derailleur associated with a front chain gear assembly having at least three chain gears of different diameters, said derailleur for switching a driving chain from one front chain gear to another for changing bicycle gear speeds, comprising an inner guide plate and an outer guide plate, each comprising an elongate and lengthwise curved plate and being substantially parallel to each other, said plates being spaced at an interval larger than a width of said chain and supported movably axially of said front chain gears, said outer guide plate having an outer plate chain biasing region which comes into contact with said chain and biases said chain toward an inner smaller diameter front chain gear when said chain is switched thereto from an outer larger diameter front chain gear and an outer plate chain moving region having an outside swollen portion swollen outwardly with respect to said front gears, said outside swollen portion enabling said chain to move when switched to said inner smaller diameter front chain gear, said outer plate chain moving region being positioned below said outer plate chain biasing region.

2. A chain guide for a front derailleur according to claim 1, wherein a border between said outside swollen portion and a not-swollen portion of said outer guide plate is substantially parallel to a movement path of said chain while said chain is engaging with said front chain gears.

3. A chain guide at a front derailleur according to claim 1, wherein said inner guide plate has an inner plate chain biasing region which contacts and biases said chain when said chain is switched from said inner smaller diameter front chain gear to said outer larger diameter front chain gear and an idle region positioned below said inner plate biasing region, said inner plate biasing region including an inner plate chain moving region through which said chain moves when switched to said inner smaller diameter front chain gear, said idle region having an inside swollen portion which swells inwardly with respect to said front chain gears.

* * * * *